United States Patent
Lee et al.

(10) Patent No.: US 7,548,390 B2
(45) Date of Patent: Jun. 16, 2009

(54) HDD WRITE CONTROL METHOD AND APPARATUS

(75) Inventors: Jung-ho Lee, Suwon-si (KR); Da-woon Chung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/766,944

(22) Filed: Jun. 22, 2007

(65) Prior Publication Data

US 2007/0297086 A1    Dec. 27, 2007

(30) Foreign Application Priority Data

Jun. 27, 2006    (KR) .................. 10-2006-0058100

(51) Int. Cl.
*G11B 21/02* (2006.01)
*G11B 27/36* (2006.01)

(52) U.S. Cl. ................ 360/75; 360/60; 360/31

(58) Field of Classification Search ............ None
See application file for complete search history.

(56) References Cited

U.S. PATENT DOCUMENTS

| 7,142,385 | B2 * | 11/2006 | Shimotono et al. ........ 360/60 |
| 7,199,969 | B2 * | 4/2007 | Yoshida ............ 360/97.01 |
| 2004/0125490 | A1 | 7/2004 | Fujiki et al. |
| 2004/0240098 | A1 | 12/2004 | Ito et al. |
| 2005/0213242 | A1 * | 9/2005 | Fujiki et al. ............ 360/75 |
| 2007/0120528 | A1 * | 5/2007 | Burgan et al. ............ 320/114 |

FOREIGN PATENT DOCUMENTS

| JP | 2000-122813 | 4/2000 |
| KR | 1020050033463 A | 4/2005 |

* cited by examiner

*Primary Examiner*—Jason C Olson
(74) *Attorney, Agent, or Firm*—Volentine & Whitt, P.L.L.C.

(57) ABSTRACT

A Hard Disk Drive (HDD) and related write control method are disclosed. The write control method includes; detecting a free fall state during a current write operation to a current sector, waiting until completion of the current write operation to the current sector, and thereafter stopping the current write operation and unloading a read/write head performing the current write operation.

17 Claims, 8 Drawing Sheets

HDD WRITE CONTROL METHOD AND APPARATUS

BACKGROUND OF THE INVENTION

1. Field of the Invention

The present invention relates to a write control method and apparatus associated with a hard disk drive (HDD). More particularly, the invention relates to a write control method for a HDD performing a synchronous write head retraction upon detection of a free fall state.

This application claims the benefit of Korean Patent Application No. 10-2006-0058100, filed on Jun. 27, 2006, the disclosure of which is hereby incorporated by reference.

2. Description of the Related Art

An HDD is a recording device used to store information. Information is recorded on concentric tracks on the surface of a magnetic disk. The disk is mounted on a rotating spindle motor, and the information is accessed by a read/write head mounted on an actuator arm rotated by a voice coil motor (VCM). An electrical current supplied to the VCM generates torque that moves the read/write head over the surface of the disk. The read head reads recorded information by sensing variations in a magnetic field associated with the surface of the disk. A variable current is supplied to the write head to record information on the tracks. This current generates a magnetic field that selectively magnetizes the disk surface in relation to the information being recorded.

The contemporary incorporation of HDDs into a range of consumer products as resulted in continuing efforts to miniaturize HDD designs. Indeed, some HDDs are now being used in portable mobile devices such as laptop computers, MP3 players, cellular phones, and personal digital assistants (PDAs).

Unfortunately, portable mobile devices are prone to being dropped during their use. The resulting mechanical shock can be particularly devastating to HDD components (e.g., read/write heads, associated transport mechanisms and disk surfaces), since conventional HDD designs make no provision whatsoever for such abuse.

To better secure (or immunize) miniaturized HDD components from mechanical shocks, technology has been introduced to detect external impacts (e.g., drops, vibration or other shocks), and if necessary, unload the read/write head in the HDD. In this context, the term "unload" generally subsumes any process whereby a read/write head is moved from a normal range of operating positions into a specially provided shock resistant position.

Examples of technology adapted to protect a HDD from external impacts are Japanese Patent No. 2000-99182, published in Apr. 7, 1999, and Japanese Patent No. 2002-8336, published in Jan. 11, 2002. These applications generally describe technology that detects a so-called "free fall state" commonly associated with drops. A free fall sensor (FFS) is used to detect the free fall state. In response to this detection, the read/write head is quickly unloaded.

FIG. 1 is a perspective view of a conventional FFS 50 formed from a 3-axis acceleration detector. FFS 50 includes a suspended mass 52 and attached, orthogonally disposed piezo elements 54. In its suspended configuration, mass 52 moves in the x, y, and z-axis directions under the influence of external forces (e.g. gravity) applied to a HDD incorporating FFS 50. Movements in the position of mass 52 stress (compressive or tensile) the suspending attachments and induce changes in the amplitude of electrical signals output by piezo elements 54. Motion or acceleration of mass 52 in the x, y, and z-axis directions may be determined in relation to the electrical signals output from piezo elements 54. A free fall state for the HDD may then be detected using the calculated acceleration of mass 52.

FIG. 2 is a conceptual diagram and FIG. 3 is a related waveform diagram further illustrating the conventional approach to detecting a HDD free-fail state. Referring to FIG. 2, free fall acceleration is applied to a HDD when it is dropped at time t=0. The HDD is in a free fall state during a time period t=1 until striking a surface at time t=2. Before being dropped at time t=0, a free fall sensor within the HDD detects a constantly applied acceleration of "1G" or the unit gravity acceleration constant. However, while falling during time period t=1, the free fall sensor no longer detects the 1G acceleration upon its constituent mass. This detection transition from a 1G applied force to a 0G applied force indicates the free fall state.

With reference to FIG. 3, a 3-axis summed acceleration vector is constantly calculated from electrical signals provide by the free fall sensor. So long as the HDD remains in a held or supported state, this acceleration vector remains close to 1G. Once the HDD is dropped however, the acceleration vector falls to 0G passing through a threshold Th during a fall time period Tfall. As illustrated in FIG. 3, the free fall state is detected and a corresponding "DETECT FFS" is generated in relation to this signal transition. When the free fall detection signal "DETECT FFS" is generated (here a logic value of "1" is assumed), the HDD performs an unload operation. The unload operation generally involves retracting the read/write head from its normal operating range and then parking the read/write head in a secure location away from the surface of the disk.

A conventional HDD initiates the unload operation upon detection of a free fall state in order to quickly protect the HDD components. FIG. 4 is a flowchart illustrating a conventional unload operation in a case where a free fall state occurs while the HDD is conducting a write operation.

Referring to FIG. 4, an HDD initiates a write operation (i.e., enters a write mode) in response to an instruction received from a host (not shown).

When in write mode, the HDD positions its read/write head over a target sector of a target track of a disk, and then writes data to the target sector (S404). The HDD also writes data sector by sector. This write operation performance is well understood.

While in write mode and while performing one or a sequence of write operations, the HDD determines whether or not a free fall state is detected (S406). In the illustrated example, a free fall detection signal acts as an interrupt signal to the normal write mode operation of the HDD.

So long as a free fall state is not detected (S406=no), the HDD determines whether or not the write operation is complete (S408). If it is determined that all pending write operations are complete (S408=yes), the write mode is terminated. Otherwise (S408=no), the write mode persists and write operations are performed (S404).

However, when a free fall state is detected (S406=yes), the HDD immediately stops the write operation (S410) and performs an unload operation (S412). The unload operation moves the read/write head to a safe parking area (e.g. a parking ramp or off the recording surface of the disk).

The HDD then waits until the free fall state ends (S414). Once the end of the free fall state is sensed (S414=yes), the HDD loads the read/write head back into its working condition (S416), and restarts the interrupted write operation (S418). The end of the free fall state is typically determined by detecting the passing of the mechanical shock that is inevitably associated with the free fall state. A shock detection sensor (not shown) may be used for this purpose.

However, according to the conventional unload operation illustrated in FIG. 4, if the HDD is reset in response to the free fall state induced shock, a read error may occur in the sector being written to when the free fall state caused an interrupt in operation.

Consider, for example, the conceptual diagram of FIG. 5 which further illustrated how such a read error might be generated by use of the conventional unload operation.

Referring to FIG. 5, it is assumed that a write operation is performed in the order of a sector N, a sector N+1, and a sector N+2. According to the conventional unload operation, as soon as a free fall state is detected, the write operation is stopped and the unload operation begins.

For example, if the free fall state is detected while the write operation is writing data to sector N+1, the write operation immediately stops, and the unload operation is performed. Thus, data may not be completely in sector N+1 and will not be written to any subsequent sector (i.e., sector N+2).

So long as the write operation is performed for all of sector N+1 after the free fall state ends, no read error will occur during future read operations. However, if shock associated with the free fall is severe that the host device or HDD enter a reset state, the information associated with the interrupted write mode will be lost and the ongoing write mode is cancelled. Thus, when the HDD ultimately resets in its operation, even though the HDD has survived the drop and the corresponding free fall state has ended, the data associated with the interrupted write operation is not written to sector N+1. Accordingly, sector N+1 may include partially written and erroneous data that will cause a read error during subsequent read operations.

SUMMARY OF THE INVENTION

Embodiments of the invention provide a write control method better able to prevent read errors by performing an unload operation only after completing a current write operation within the current sector in which a free fall state is detected. Embodiments of the invention also provide an apparatus suitable for performing this write control method.

In one embodiment, the invention provides a write control method for a hard disk drive (HDD), comprising; detecting a free fall state during a current write operation to a current sector, waiting until completion of the current write operation to the current sector, and thereafter stopping the current write operation and unloading a read/write head performing the current write operation.

In another embodiment, the invention provides a related write control method, further comprising; detecting an end of the free fall state following unloading of the read/write head, and thereafter, loading the read/write head and restarting the current write operation.

In related aspects, the free fall state may be detected in relation to a free fall detection signal generated by a free fall sensor incorporated in the HDD. The end of the free fall state may be detected in relation to a shock detection signal generated by a shock detector incorporated in the HDD.

In another embodiment, the invention provides a hard disk drive (HDD) comprising; a head adapted to write data to a disk during a current write operation, means for loading and unloading the head from the disk, a free fall sensor detecting a free fall state and outputting a corresponding free fall detection signal, a controller responsive to the free fall detection signal during the current write operation and controlling the means for loading and unloading to unload the head from the disk immediately after completing the current write operation in the current sector, and stopping the current write operation.

In a related embodiment of the invention, the HDD also comprises a shock detector detecting an end to the free fall state and generating a corresponding shock detection signal, wherein the controller is responsive to the shock detection signal to control the means for loading and unloading to load the head to the disk, and re-start the current write operation.

In another related embodiment, the HDD may also comprise a memory storing controller executable software controlling operation of the means for loading and unloading the head, a control loop operative on the free fall sensor to detect the free fall state, and/or a control loop operative on the shock detector to detect the end of the free fall state.

DESCRIPTION OF EMBODIMENTS

DESCRIPTION OF EMBODIMENTS

Embodiments of the invention will now be described with reference to the accompanying drawings. While the invention is described in the context of the illustrated embodiments, it is understood that the invention may be variously embodied and that the invention is not limited to only the illustrated examples. Rather, the illustrated embodiments are presented as teaching examples.

Figure 1:
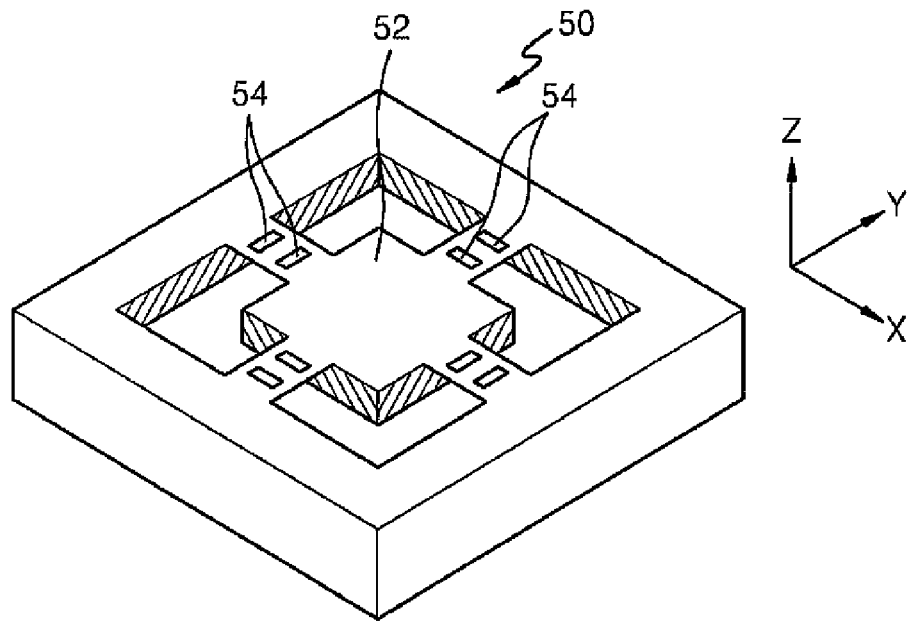
FIG. 1 is a perspective view of a conventional acceleration detector.
Figure 2:
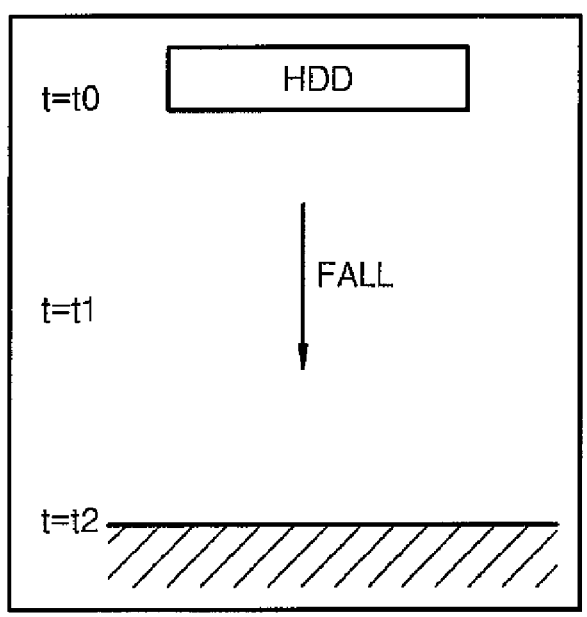
FIGS. 2 and 3 are related diagrams illustrating the operation of a conventional method of detecting free fall state and performing an unload operation.
Figure 3:
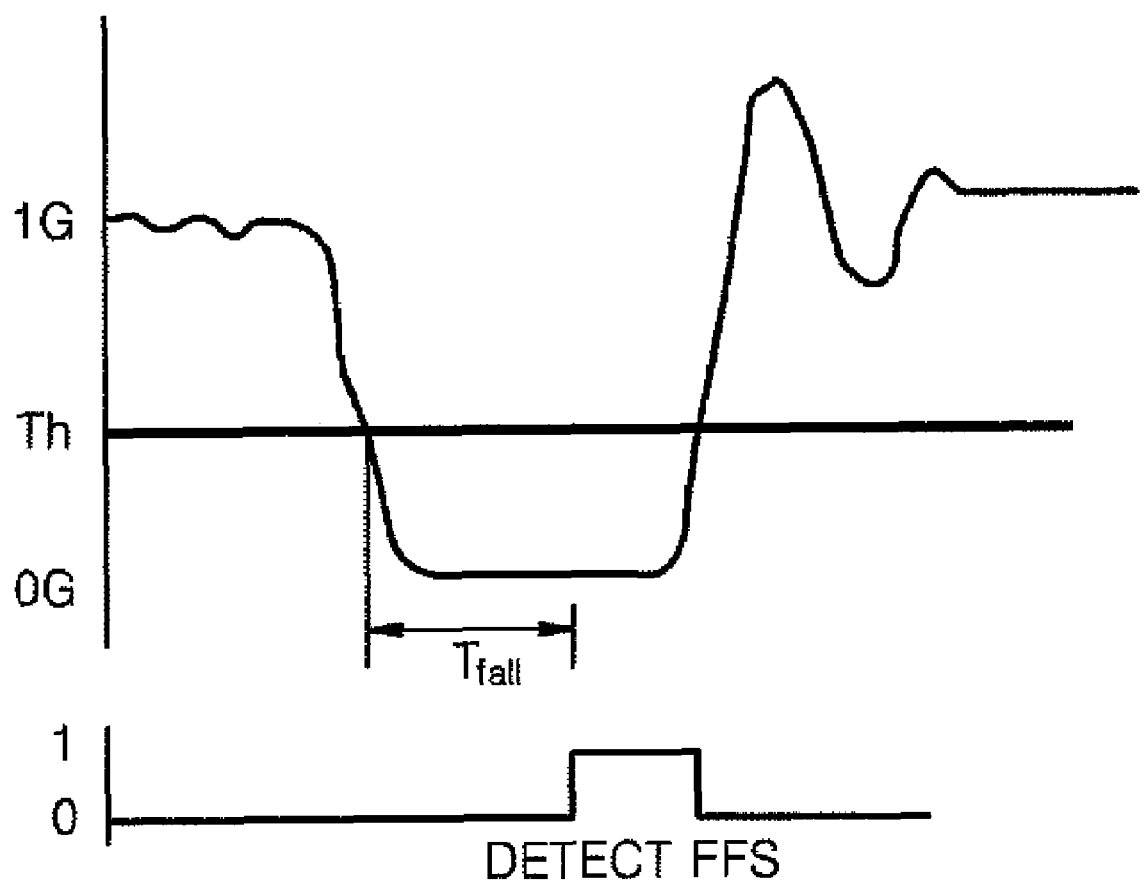
Figure 4:
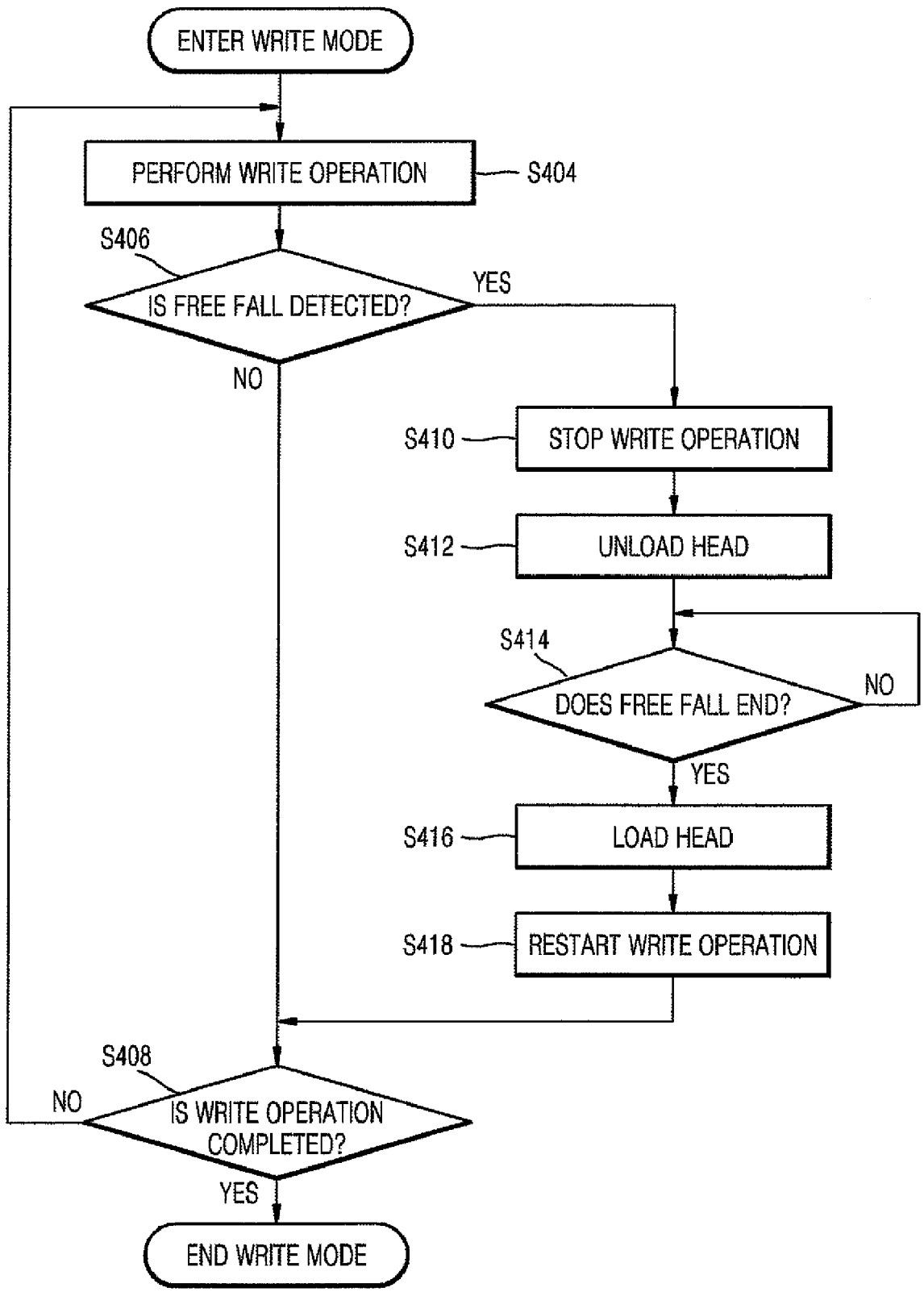
FIG. 4 is a flowchart illustrating a conventional unload method.
Figure 5:
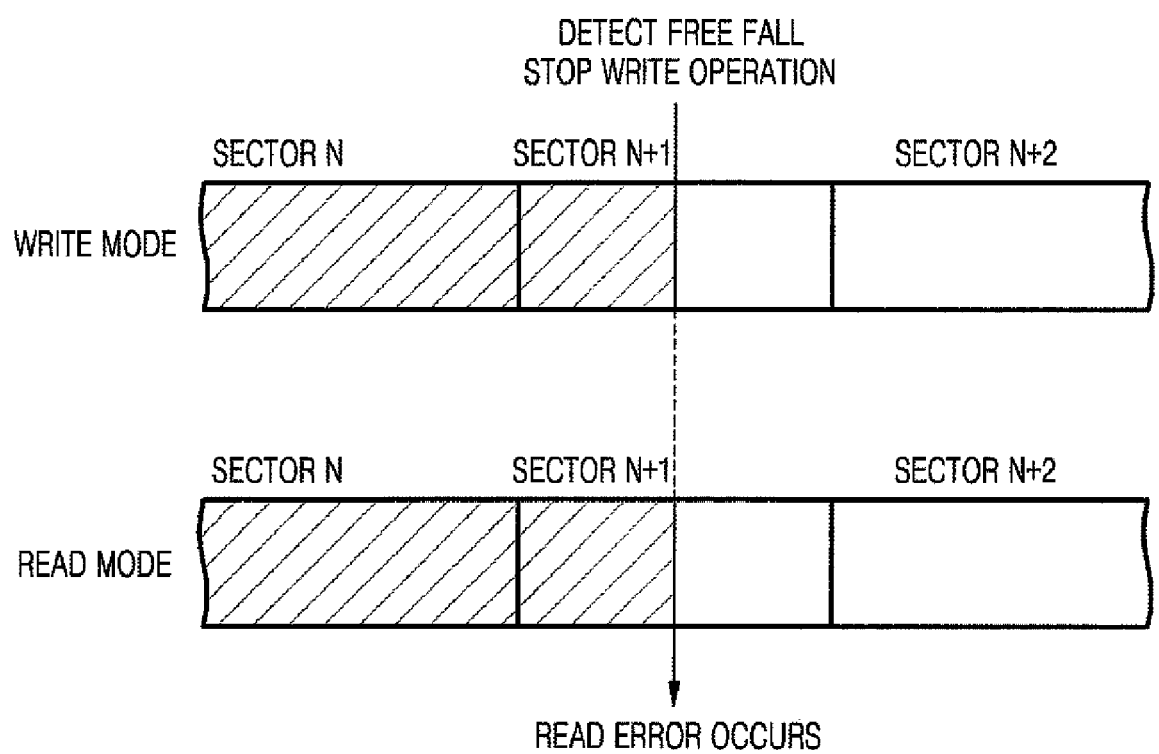
FIG. 5 is a conceptual diagram illustrating the occurrence of read error caused by the conventional unload method.
Figure 6:
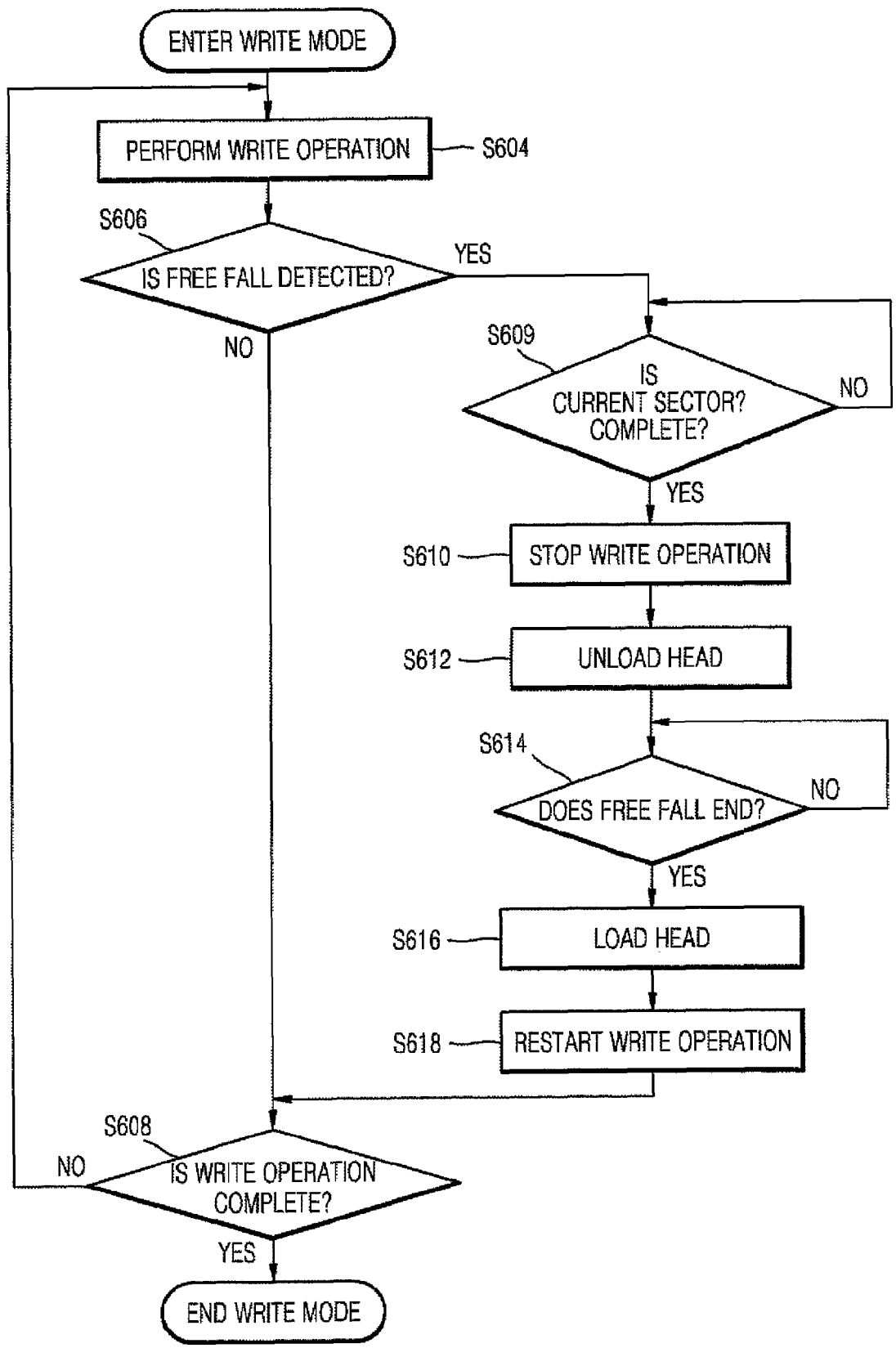
FIG. 6 is a flowchart illustrating a write control method according to an embodiment of the invention.

FIG. 6 is a flowchart illustrating a write control method according to an embodiment of the invention.

Referring to FIG. 6, an HDD initiates a write operation (i.e., enters a write mode) in response to an instruction received from a host (not shown).

When in write mode, the HDD positions its read/write head over a target sector of a target track of a disk, and then writes data to the target sector (S604). The HDD also writes data sector by sector. This write operation performance is conventional and well understood.

While in write mode and while performing one or a sequence of write operations, the HDD determines whether or not a free fall state is detected (S606). In the illustrated example, a free fall detection signal acts as an interrupt signal to the normal write mode operation for the HDD.

So long as a free fall state is not detected (S606=no), the HDD determines whether or not the write operation is complete (S608). If it is determined that all pending write operations are complete (S608=yes), the write mode is terminated.

Otherwise (S608=no), the write mode persists and write operations are performed (S604).

However, when a free fall state is detected (S606=yes), the HDD next determines whether the current write operation has completed writing data to the current sector (S609). The current write operation is the write operation being performed when the free fall state is detected, and the current sector is the specific sector being written to by the current write operation when the free fall state is detected. Only after all of the data intended for the current sector has been written to the current sector will the unload operation continue (S609=yes).

After completing the current sector, the current write operation is immediately stopped (S610) and an unload operation (S612) is performed. The unload operation may be conventional in its actual mechanical and electrical execution to move the read/write head to a safe parking area (e.g. a parking ramp or off the recording surface of the disk).

The HDD then waits until the free fall state ends (S614). Once the end of the free fall state is sensed (S614=yes), the HDD loads the read/write head back into its working condition (S616), and restarts the interrupted current write operation (S618). The end of the free fall state is typically determined by detecting the passing of the mechanical shock that is inevitably associated with the free fall state. A shock detection sensor (not shown) may be used for this purpose.

In those instances where a mechanical shock associated with the free fall state causes a reset of the host device and/or the HDD, the write control method illustrated in FIG. 6 prevents subsequent read errors because the preceding unload operation was performed only after the current write operation completed the current sector of data writing. Thus, no partially written sector exists to cause a read error.

Figure 7:
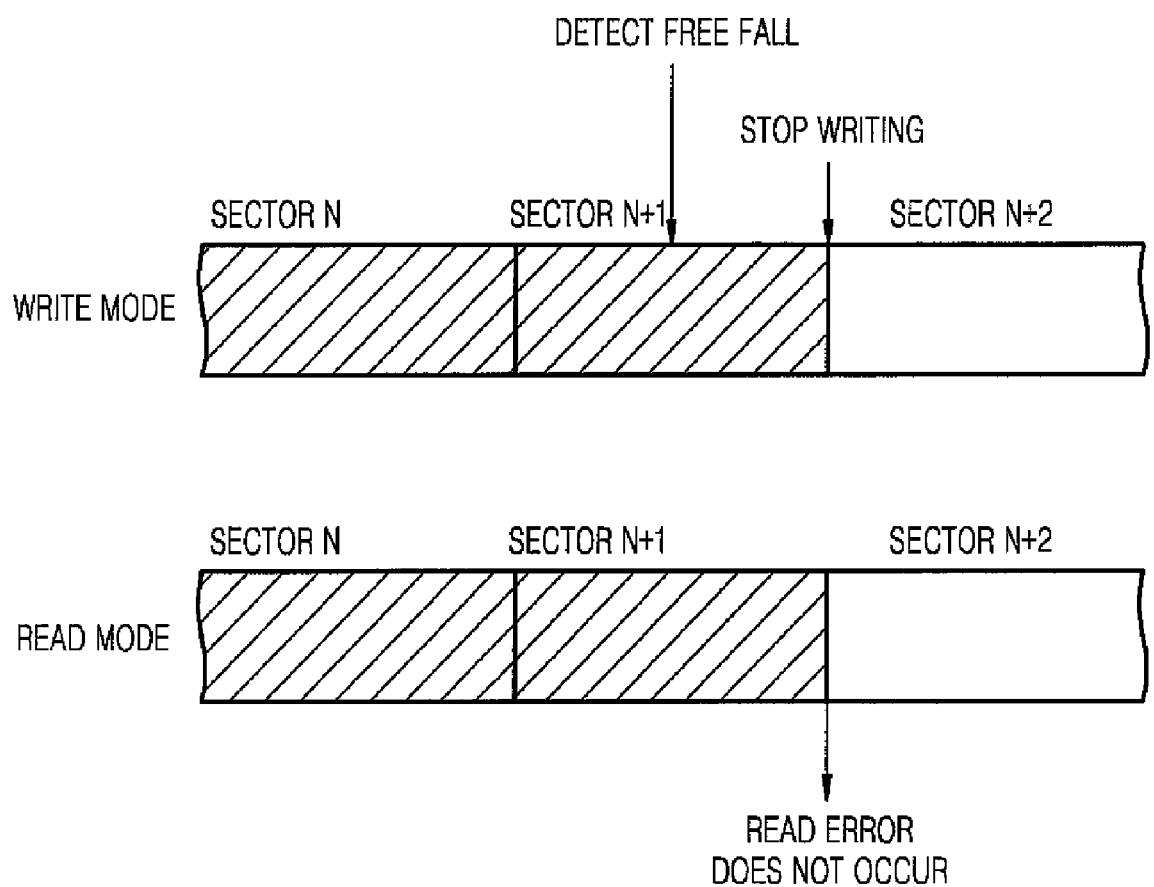
FIG. 7 is a conceptual diagram explaining why a read error is prevented by the write control method illustrated in FIG. 6, according to an embodiment of the invention.

FIG. 7 is a conceptual diagram further describing how the foregoing is accomplished. Referring to FIG. 7, it is again assumed that the write operation is performed in the order of sector N, sector N+1, and sector N+2. If free fall is detected while the current write operation is writing data to sector N+1, the unload operation is performed only after the current write operation completes the current sector (i.e., sector N+1).

According to the write control method illustrated in FIGS. 6 and 7, according to an embodiment of the invention, since the unload operation is performed only after the current write operation completes the current sector, future read error do not occur due to a partially written sector.

To further illustrate this point, consider that most contemporary HDDs are designed to tolerate a drop of about 30 cm. It takes about 250 ms for a HDD to fall 30 cm. It takes about 180 ms for contemporary free fall detection sensors to detect a free fall state. Thus, a free fall duration between detection and impact is around 70 ms.

In contemporary HDDs, is takes up to 10 µs to write data to a single sector of a target track on a disk. Thus, the time required to complete a current write operation to a current sector is sufficiently short to allow its completion during the free fall duration of around 70 ms and still provide adequate time to unload the read/write head.

Embodiments of the invention may be incorporated into many different types of HDDs. One example is illustrated in FIG. 8.

Figure 8:
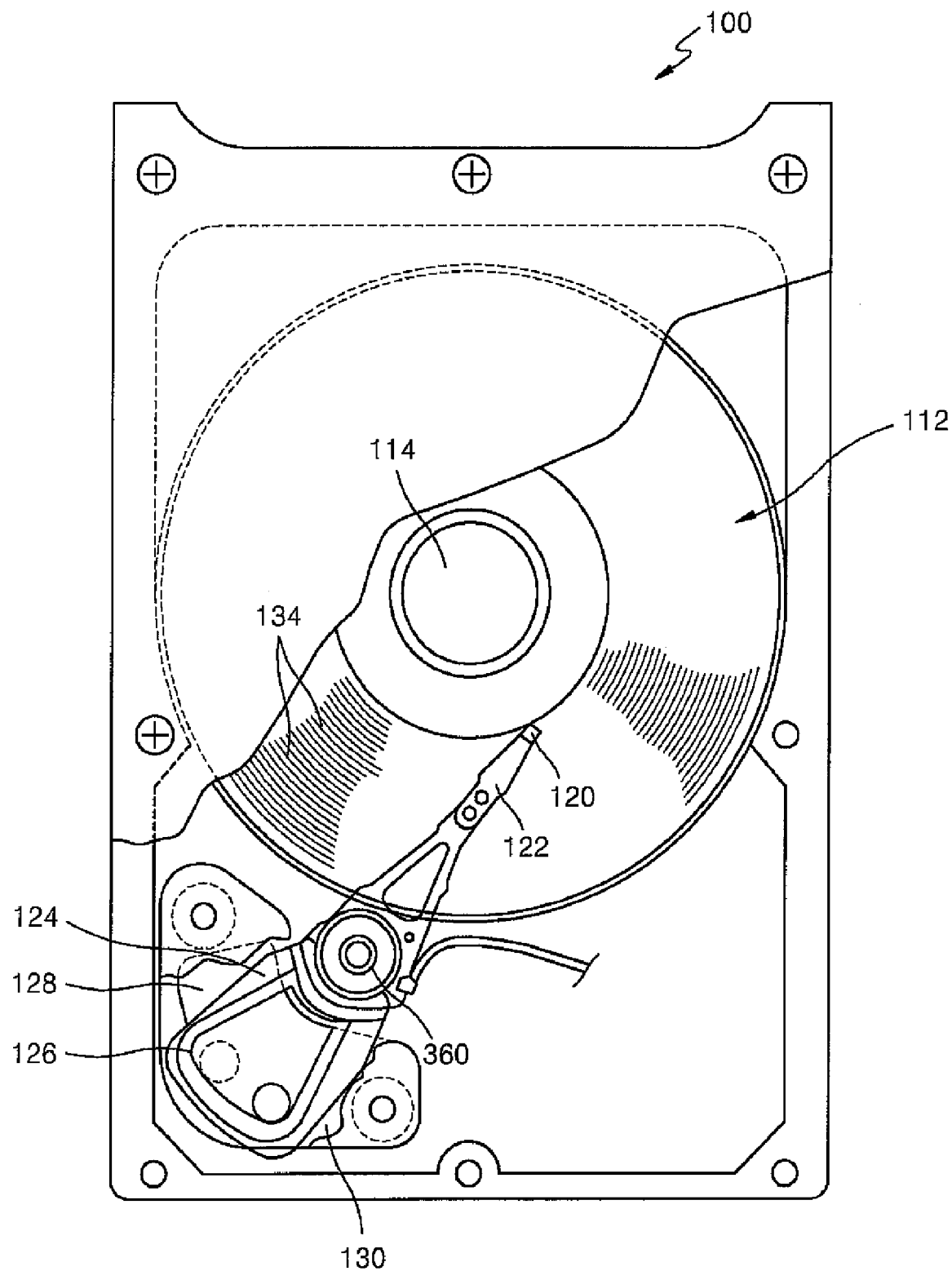
FIG. 8 is a schematic plan view of a hard disk drive (HDD) to which the write control method according to an embodiment of the invention may be applied.

FIG. 8 is a schematic plan view of an HDD 100 to which the write control method according to an embodiment of the invention may be applied. Referring to FIG. 8, HDD 100 includes at least one disk 112 rotated by a spindle motor 114. HDD 100 also includes a head 120 floating above the surface of disk 112.

Head 120 can read information from or write information to rotating disk 112 by sensing a magnetic field from the surface of disk 112 or magnetizing the surface of disk 112, respectively. A single read/write head 120 is shown in FIG. 8, with head 120 including a write head for magnetizing disk 112 and a separate read head for sensing the magnetic field of disk 112. Other head types may be used.

Head 120 generates an air bearing between the head 120 and the surface of disk 112. Head 120 is combined with a head stack assembly (HSA) 122. HSA 122 is attached to an actuator arm 124 having a voice coil 126. Voice coil 126 is located adjacent to a magnetic assembly 128 to define a voice coil motor (VCM) 130. A current supplied to voice coil 126 generates torque which rotates actuator arm 124 around a bearing assembly 360. The rotation of actuator arm 124 moves head 120 across the surface of disk 112. Collectively and under the control of controller 202, these components may operationally form means for loading and/or unloading head 120. Other structural equivalents may be used.

Information is stored in concentric tracks of disk 112. In general, disk 112 includes a data zone in which user data is recorded, a parking zone in which head 120 is located when HDD 100 is not used, and a maintenance cylinder. The maintenance cylinder is used for storing a head type, write parameter compensation values (A and B) at high and low temperatures, and write parameter compensation values according to the head type.

Figure 9:
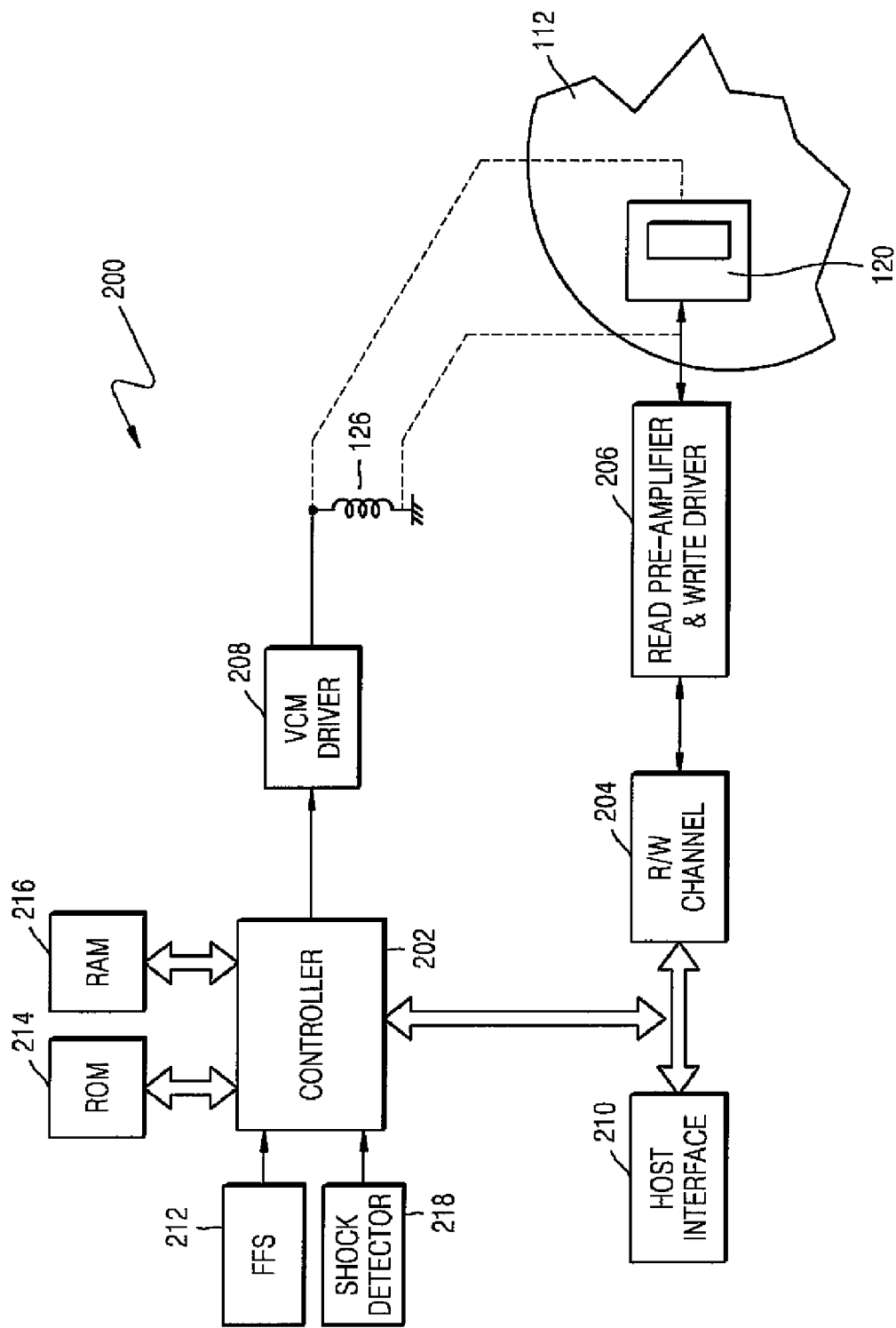
FIG. 9 is a block diagram of a control system for the HDD illustrated in FIG. 8, according to an embodiment of the invention.

FIG. 9 is a block diagram of a control system 200 for the HDD illustrated in FIG. 8, according to an embodiment of the invention.

Referring to FIG. 9, control system 200 includes a controller 202 connected to head 120 through a read/write (R/W) channel circuit 204 and a read pre-amplifier & write drive circuit 206. Controller 202 may be a digital signal processor (DSP), a microprocessor, or a micro-controller.

Controller 202 provides a control signal to R/W channel circuit 204 to read data from or write data to disk 112.

Information is typically transmitted from RAW channel circuit 204 to a host interface circuit 210. Host interface circuit 210 includes a control circuit (not shown) for interfacing with a host computer (not shown) such as a personal computer (PC).

During a read mode, R/W channel circuit 204 converts an analog signal read by head 120 and amplified by read pre-amplifier & write drive circuit 206 into a host computer-readable digital signal, and outputs the digital signal to host interface circuit 210. During a write model R/W channel circuit 204 receives user data from the host computer via host interface circuit 210, converts the user data into a disk-recordable write current, and outputs the write current to read pre-amplifier & write drive circuit 206.

Controller 202 is also connected to a VCM driver 208 supplying a driving current to voice coil 126. Controller 202 provides a control signal to the VCM driver 208 to control VCM 130 and the motion of head 120.

Controller 202 is also connected to a nonvolatile memory, such as a read only memory (ROM) 214 or a flash memory, and to a random access memory (RAM) 216. Memories 214 and 216 store software routines and data, which are used by controller 202 to control HDD 100. One of the software routines is a software routine for the write control method illustrated in FIG. 6.

For example, controller 202 may performs the write control method according to an algorithm consistent with the flowchart shown in FIG. 6.

If a free fall state is detected while data is being written to disk 112, controller 202 waits until the current write operation finishes the current sector, and only then unloads head 120. Controller 202 determines by monitoring an output of a free fall sensor (FFS) 212 whether the free fall state has ended. If it is determined by referring to a shock detection signal generated by a shock detector 218 that the free fall state has ended, controller 202 re-loads head 120 and restarts the write operation.

Embodiments of the invention may be implemented as a method, an apparatus, and/or a system. When an embodiment of the invention is implemented in software (or one or more control loops implemented in whole or in part by software), various software components may be embodied as code segments for executing required operations. A program or the code segments can be stored in a processor readable recording medium and transmitted as computer data signals combined with a carrier using a transmission medium or a communication network. The processor readable recording medium is any data storage device that can store or transmit data which can be thereafter read by a computer system. Examples of the processor readable recording medium include electronic circuits, semiconductor memory devices, read-only memory (ROM), flash memory, erasable ROM, floppy disks, optical discs, hard disks, optical fiber media, and RF networks.

As described above, according to embodiments of the invention, if a free fall state occurs during write mode, an unload operation is performed to protect HDD components (e.g., heads and disks). The unload operation is synchronized with completion of the current sector write, thereby preventing a future read error from occurring in relation to the current sector.

While the present invention has been particularly shown and described with reference to exemplary embodiments thereof, it will be understood by those of ordinary skill in the art that various changes in form and detail may be made therein without departing from the scope of the present invention as defined by the following

What is claimed is:

1. A write control method for a hard disk drive (HDD), comprising:
    detecting a free fall state during a write operation of the HDD, the write operation including writing data to a current sector of the HDD when the free fall state is detected;
    determining when the write operation completes writing the data to the current sector after detecting the free fall state; and
    when the write operation completes writing the data to the current sector, interrupting the write operation and unloading a read/write head performing the write operation.

2. The write control method of claim 1, further comprising:
    detecting an end of the free fall state following unloading of the read/write head; and,
    loading the read/write head and restarting the write operation after the end of the free fall state is detected.

3. The write control method of claim 1, wherein the free fall state is detected in relation to a free fall detection signal generated by a free fall sensor incorporated in the HDD.

4. The write control method of claim 1, wherein the free fall detection signal is derived from a 3-axis summed acceleration vector.

5. The write control method of claim 2, wherein the end of the free fall state is detected in relation to a shock detection signal generated by a shock detector incorporated in the HDD.

6. A hard disk drive (HDD) comprising:
    a head adapted to write data to a disk during a write operation, the disk comprising a plurality of sectors;
    means for loading and unloading the head from the disk;
    a free fall sensor for detecting a free fall state and outputting a corresponding free fall detection signal, the write operation including writing data to a current sector of the HDD when the free fall state is detected; and
    a controller for determining when the write operation completes writing the data to the current sector in response to the free fall detection signal, controlling the means for loading and unloading to unload the head from the disk immediately after the write operation completes writing the data to the current sector, and interrupting the write operation.

7. The HDD of claim 6, further comprising:
    a shock detector for detecting an end to the free fall state and generating a corresponding shock detection signal;
    wherein the controller, in response to the shock detection signal, controls the means for loading and unloading to load the head to the disk, and restarts the write operation.

8. The HDD of claim 6, wherein the free fall sensor comprises a 3-axis acceleration detector providing a summed acceleration vector as the free fall detection signal.

9. The HDD of claim 7, further comprising:
    a memory for storing controller executable software for controlling operation of the means for loading and unloading the head.

10. The HDD of claim 9, wherein the controller executable software defines a control loop operative on the free fall sensor to detect the free fall state.

11. The HDD of claim 9, wherein the controller executable software defines a control loop operative on the shock detector to detect the end of the free fall state.

12. A write control method for a hard disk drive (HDD), comprising:
    initiating a write operation comprising writing data to a plurality of sectors of the HDD;
    detecting a free fall state during the write operation;
    determining whether data is being written to a current sector of the plurality of sectors when the free fall state is detected;
    when the data is being written to the current sector, continuing the write operation until the current sector is complete;
    interrupting the write operation after the current sector is complete; and
    unloading a read/write head performing the write operation.

13. The write control method of claim 12, further comprising:
    detecting an end of the free fall state following unloading of the read/write head; and
    loading the read/write head and restarting the write operation after the end of the free fall state is detected.

14. The write control method of claim 12, further comprising:
    generating a free fall detection signal in response to detecting the free fall state, the free fall detection signal being generated by a free fall sensor incorporated in the HDD.

15. The write control method of claim 14, wherein the free fall detection signal is derived from a 3-axis summed acceleration vector.

16. The write control method of claim 13, wherein detecting the end of the free fall state comprises detecting a shock to the HDD.

17. The write control method of claim 16, further comprising:
generating a shock detection signal, wherein the read/write head is loaded and the write operation is restarted in response to the shock detection signal.

* * * * *